United States Patent

Fiala

[11] Patent Number: 5,868,533
[45] Date of Patent: Feb. 9, 1999

[54] FINISHING TOOL FOR PRECISION MACHINING OF HOLES

[76] Inventor: Stanislav Fiala, Josefy Fajmonove 2, 628 00 Brno, Czech Rep.

[21] Appl. No.: 776,999
[22] PCT Filed: Jul. 27, 1995
[86] PCT No.: PCT/CZ95/00015
§ 371 Date: Mar. 21, 1997
§ 102(e) Date: Mar. 21, 1997
[87] PCT Pub. No.: WO96/04089
PCT Pub. Date: Feb. 15, 1996

[30] Foreign Application Priority Data

Aug. 1, 1994 [CZ] Czech Rep. .................. PUV 2737-94

[51] Int. Cl.[6] .......................... B23B 51/00; B23B 31/113
[52] U.S. Cl. .............................. 408/226; 279/93; 279/97; 403/349
[58] Field of Search ................................ 408/226, 239 R, 408/239 A; 279/93, 97, 904; 403/348, 349; 285/360, 361, 396

[56] References Cited

U.S. PATENT DOCUMENTS

| | | | |
|---|---|---|---|
| 931,327 | 8/1909 | Manzel | 279/93 |
| 966,925 | 8/1910 | Kittredge | 285/361 |
| 981,866 | 1/1911 | Lockhart | 285/361 |
| 1,766,136 | 6/1930 | Markstrum | 279/93 |
| 2,057,143 | 10/1936 | Gairing | 279/93 |
| 2,299,357 | 10/1942 | Strunk et al. | 403/349 |
| 2,337,402 | 12/1943 | Mills | 279/83 |
| 4,995,768 | 2/1991 | Craft | 408/239 A |
| 5,090,488 | 2/1992 | Cotton | 408/226 |
| 5,397,196 | 3/1995 | Boiret et al. | 403/348 |

FOREIGN PATENT DOCUMENTS

| | | |
|---|---|---|
| 0508468 | 1/1994 | European Pat. Off. . |
| 90134 | 3/1990 | Japan ..................... 403/348 |

Primary Examiner—Steven C. Bishop
Attorney, Agent, or Firm—Dvorak & Orum

[57] ABSTRACT

Finishing tool for precision machining of holes includes a chuck unit having a driving head and a replaceable cutting element which includes at least one cutting blade and a cylindrical support shaft that is provided with a drive pin projecting from the supporting shaft. The supporting shaft being is inserted into a cylindrical hollow of the driving head and the drive head includes a support groove for receiving the drive pin, while the pin is retained by a spring-loaded return movement prevention device.

3 Claims, 2 Drawing Sheets

FINISHING TOOL FOR PRECISION MACHINING OF HOLES

BACKGROUND OF THE INVENTION

1. Field of the Invention

The invention relates to a finishing tool for precision machining of holes, comprising a chunk unit, driving head and a replaceable cutting element having at least one cutting blade, said element supported by a cylindrical supporting shaft which includes a drive pin projecting from said supporting shaft on at least one side. The supporting shaft is inserted into a cylindrical hollow of said driving head which includes a guiding recess that opens into a support groove for said drive pin.

2. Discussion of the Prior Art

Considerable demands on general precision regarding manufacturing and material quality are usually placed upon the finishing tools for precision machining of holes, considerably increasing the costs of such machining and the final prices.

The costs can be greatly reduced by providing a tool with an elongated shank for enabling flexible guidance into a pre-bored hole and compensation of possible misalignments of the hole and of the tool.

Tools with replaceable cutting elements which wear out sooner than supporting elements of the tool are well-suited for such application. Replaceability of the cutting element is economically advantageous in tools with abrasion resistant coatings, e.g. titanium nitride. Accordingly, effective design of replaceable cutting elements is particularly acute with the tools needed to finish small and medium diameter holes, or those within the range of 5 to 25 mm (0.196–0.0984 inches).

Tools with elongated shanks and with two to four carbide sintered guiding plates located around the circumference of the cutting part, together with a replaceable cutting blade chucked in the groove of the tool head using screws are also well known. However, the disadvantages of said design results with relatively lower productivity because of machining with only one blade and the high demands placed upon the tool holder, giving itself to the fact that the replacement and adjustment of the cutting blade chucked by a screw connection is relatively difficult, particularly with multi-spindle machines, thereby increasing idle time of the machines.

The disadvantages of these designs is the relatively unsafe fixation of the drive pin within the support groove. Typically, only a friction resistance against the effect of said compression spring hold the pin screws, resulting in spontaneous release and disengagement of the replaceable tool due to the inertial forces during stoppage of the tool or due to its impact transfer into the working position. Another significant disadvantage is that when reaming tools are used to ream smaller sized holes, it is impossible to make the outside diameter of the driving head smaller than the hole being reamed, precluding use of such tools to make deep holes.

The same disadvantage also appears in U.S. Pat. No. 2,057,143 where a further disadvantage includes the possibility of clogging of the drive pin seating groove with cuttings and impurities, thereby resulting in unreliable operation.

Also, lug type closures are well known but are dimensionally unsuitable for application on exchangeable reamers for a number of reaming operations, such as deep reaming and for those tools with a rear guide.

SUMMARY OF THE INVENTION

The above mentioned disadvantages are substantially eliminated by providing a finishing tool for precision machining of holes a spring-located retaining means for preventing pin movement.

In a preferred embodiment, the retaining means is an elastic latch.

In another embodiment the elastic latch is formed by a partition wall between a support groove and a relieve groove.

A significant advantage of such embodiment is that it can be used in a considerably wide range of reaming operations, including deep reaming.

Also advantageous, particularly from the point of view of machine tools and production idle time, it is quick and operationally easy to replace the cutting element without the need for assembling or adjustment fixtures. Resistance against chucking or on the contrary against removal of the cutting element is relatively low, likewise spontaneous release is reliably avoided.

Also the cooling medium supply can be designed very simply and effectively.

DETAILED DESCRIPTION OF THE DRAWINGS

The preferred embodiment will be more clearly illustrated in reference to the drawings where:

DETAILED DESCRIPTION OF THE PREFERRED EMBODIMENT

Figure 1:
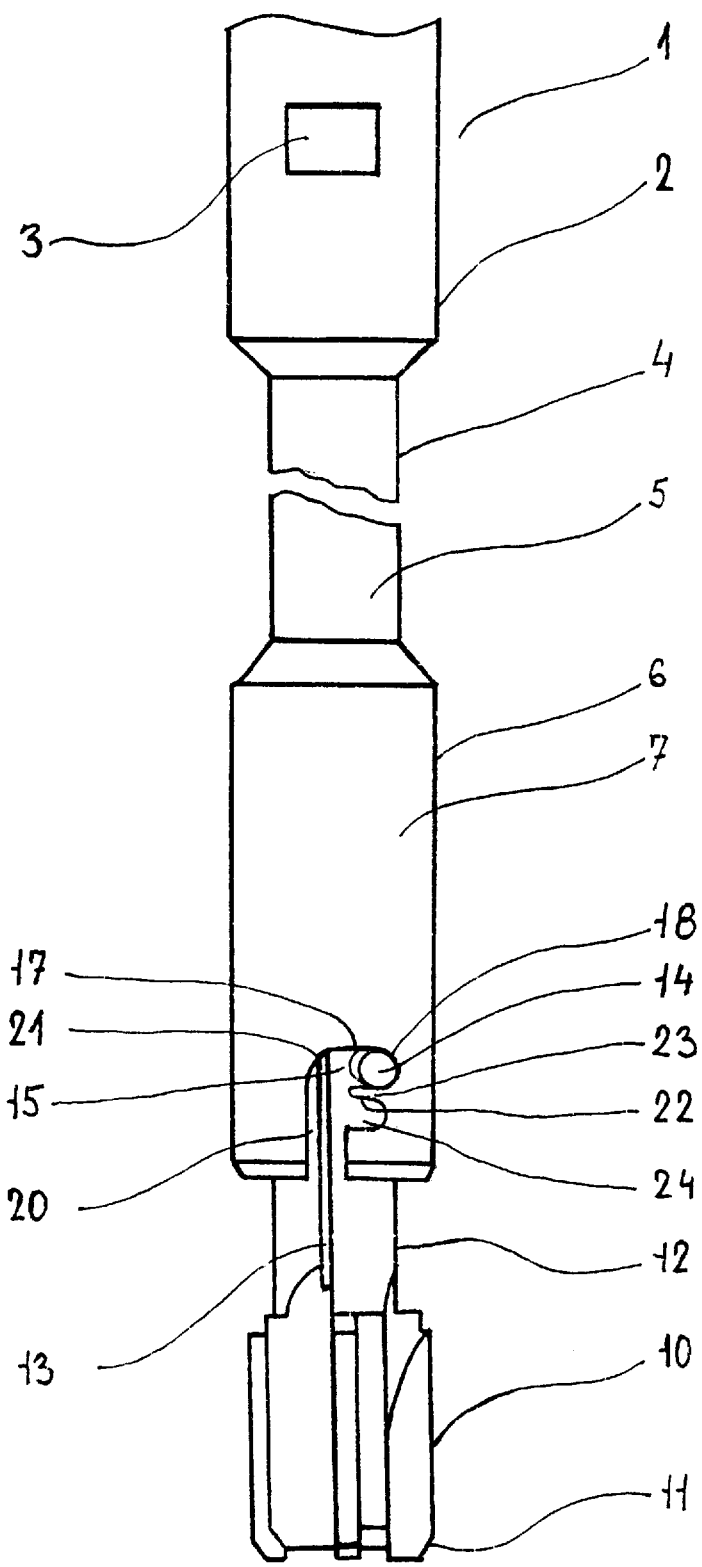
FIG. 1 illustrates a tool according to the invention with a support groove and with another parallel groove.
Figure 2:
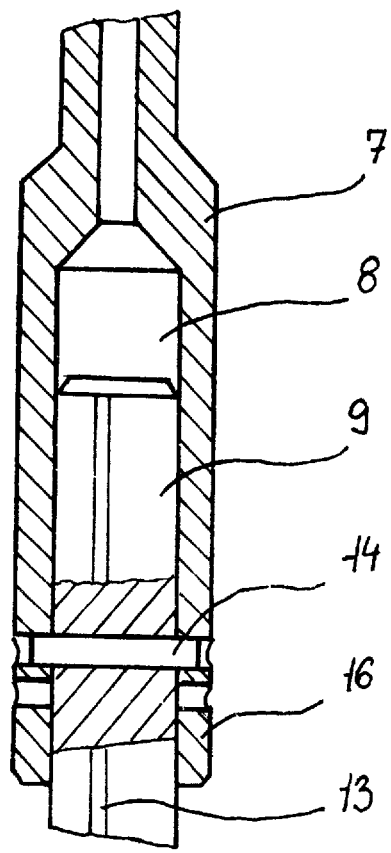
FIG. 2 illustrates a turned cross section of driving head of said tool.

The tool illustrated in FIGS. 1 and 2 consists of a chuck unit 1 consisting of a cylindrical shaft 2 having with a plane groove 3 to chuck the tool by a lock screw (not shown) in a head of a machine-tool spindle (not shown). The chuck part 1 can be of another design, for example a conical shaft. The chuck unit 1 includes a shank 4 preferably having a slender neck 5 for more elastic guidance of the tool into the pre-bored hole. Lower part 6 of shank 4 contains a driving head 7 in which there is a cylindrical hollow 8. In another embodiment, this driving head 7 can directly link up to chucking part 1 without intermediate slender neck 5. Cylindrical hollow 8 contains therein a supporting shaft 9 provided with cutting element 10 around the circumference thereof and of which cutting element is provided with four cutting blades 11.

Optimum clearance between cylindrical hollow 8 of driving head 7 and outside surface 12 of supporting shaft 9 is preferably between 5–15 $\mu$m.

When the cutting element is mounted, the provided clearance allows displacement from the tool axis positively influencing optimum centering of the cutting element with regard to the pre-bored hole with a satisfactory positional precision of a machined holed.

On cylindrical surface 12 of supporting shaft 9, there can be supply grooves 13 for receiving a supply of cooling liquid. The supporting shaft is provided with a pressed-in drive pin 14 which fits into two support grooves 15 made in tubular wall 16 or driving head 7 of shank 4. The length of the drive pin 14 equals at most the diameter of the driving head 7. The upper of the side surfaces 17 of support groove 15 includes an angle of 90° with the surface lines of cylindrical hollow 8, and the lower side surface includes with the surface lines of cylindrical hollow 8 a more acute angle in the sense that mutual distance of side surfaces 17 decreases down to the value being for example by 0.15 mm smaller than the drive pin 14 diameter.

Figure 3:
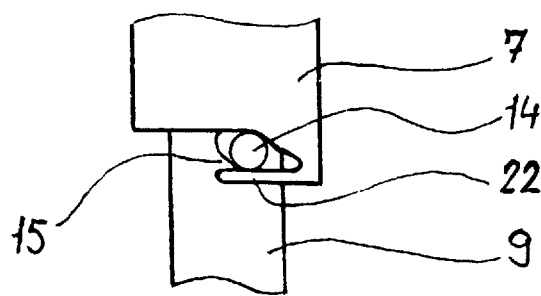
FIG. 3 illustrates another design of guiding recess and of an elastic latch.

The radius at end 18 of support groove 15 is equal to the drive pin 14 radius. Support groove 15 passes smoothly along arc 21 into vertical groove 20 into vertical groove 20. The lower of the side surfaces is the upper surface of elastic latch 22 which is a relatively thin partition wall 23 between support groove 15 and parallel groove 24 which also opens into vertical groove 20. Elastic latch 22 decreasing the distances of side surfaces 17, forms the return movement preventing means 25 for preventing a spontaneous release of cutting element 10 caused by inertial forces at the moment when rotation of the spindle with chucked tool stops, or at the moment of an impact while positioning of the revolving turret with the tool into the working position with respect to the rotating workpiece. FIG. 3 illustrates a modified embodiment of elastic latch 22, where support groove 15 is elongated by a slot 27 to increase elasticity.

Fitting of exchangeable cutting element 10 into the tool is performed by axially pushing element 10 into hollow 8 and then radially turning, while the drive pin 14 drops into the support groove 15, where it is secured by elastic latch 22. The procedure for removing the cutting element 10 from the tool is reversed, i.e. radially turning the element while overcoming the elastic resistance of the elastic latch 22 and then axial pulling the cutting element 10 out of hollow 8.

I claim:

1. A finishing tool for precision machining of holes, said tool having a central axis, comprising:

a chuck unit having a driving head;

a replaceable cutting element attached to said chuck unit at said driving head, said cutting element comprised of a cylindrical supporting shaft which includes a drive pin projecting from said supporting shaft on at least one side thereof, said drive pin having a diameter said driving head having a cylindrical hollow therein which defines a tubular wall of said driving head, said tubular wall having a wall thickness and provided with a guiding recess and a support groove disposed adjacent to said guiding recess such that said guiding recess opens into said support groove, said support groove for receiving said driving pin wherein said guiding recess is formed by at least one vertical groove having a diameter larger than that of said drive pin and an arcuate groove transversely located with respect to said support groove and continuously formed with said vertical groove, both said vertical and support grooves extending through tubular wall thickness of said driving head; and, a return movement prevention means for preventing spontaneous release of said replaceable cutting element from said hollow of said driving head, said return movement prevention means spring biased along a direction of said axis.

2. The finishing tool as claimed in claim 1, wherein the return movement prevention means is an elastic latch.

3. The finishing tool as claimed in claim 1 wherein said elastic latch is formed by a partition wall, said partition wall formed by a relief groove disposed alongside said support groove.

* * * * *